United States Patent [19]
Alsop

[11] 3,964,598

[45] June 22, 1976

[54] STACKING MECHANISM AND METHOD

[75] Inventor: Arthur Graham Alsop, Bristol, England

[73] Assignee: Strachan & Henshaw Limited, Speedwell, England

[22] Filed: July 17, 1974

[21] Appl. No.: 489,442

[30] Foreign Application Priority Data

Apr. 19, 1974 United Kingdom ............... 17356/74

[52] U.S. Cl. ................................ 198/35; 93/93 DP; 198/34; 198/76; 271/80; 271/216; 271/243

[51] Int. Cl.$^2$ ........................................ B65G 57/00

[58] Field of Search ............ 198/34, 35, 76; 271/80, 271/216, 224, 229, 233, 243; 93/93 R, 93 DP; 214/6 S, 6 R

[56] References Cited

UNITED STATES PATENTS

| | | | |
|---|---|---|---|
| 2,031,136 | 2/1936 | Sewick | 271/80 |
| 2,708,863 | 5/1955 | Payne | 93/93 DP |
| 2,805,757 | 9/1957 | Rapley | 198/35 |
| 2,852,990 | 9/1958 | Roe | 93/93 DP |
| 2,919,789 | 1/1960 | Coakley | 198/35 |
| 3,191,927 | 6/1965 | Hartbauer | 198/35 |
| 3,194,127 | 7/1965 | Larsson | 93/93 DP |
| 3,596,575 | 8/1971 | Brockmuller | 93/93 DP |
| 3,638,538 | 2/1971 | Sullivan | 198/35 X |
| 3,684,279 | 8/1972 | Heimlicher | 271/80 X |

FOREIGN PATENTS OR APPLICATIONS

| | | | |
|---|---|---|---|
| 429,583 | 7/1967 | Switzerland | 198/34 |

*Primary Examiner*—Evon C. Blunk
*Assistant Examiner*—James L. Rowland
*Attorney, Agent, or Firm*—Behr and Woodbridge

[57] ABSTRACT

A stacking mechanism and method brings batches of articles from a shingled formation on a conveyor to a vertically stacked formation without stopping the progress of any of them. Shingled articles are pushed forward from behind by a pusher at a speed greater than that of a conveyor on which they are supported while at the same time a slower-moving obstruction is erected in their path offering a vertical rear wall. The articles successively align against the rear wall of the obstruction until when the longitudinal distance between the pusher and the obstruction has become substantially the same as the length of the articles, so that all of a batch of shingled articles must have been stacked, the obstruction is withdrawn and the stack is driven on by the pusher. Hooks may travel at the same speed as the conveyor and engage over a trailing edge of the last article in a shingled batch of articles to help define the end of the batch.

10 Claims, 4 Drawing Figures

14,13
29
30
31
32
33
104
105
106
107
108
110
111
112
113
114
115
115'
117
118
118'
28
Y
Z

STACKING MECHANISM AND METHOD

FIELD OF THE INVENTION

This invention relates to stacking mechanisms and has for its object the provision of such a mechanism which will bring into discrete stacks articles which have been delivered in shingled formation.

BACKGROUND OF THE INVENTION

Delivery of articles in a shingled formation is adopted because it enables the receiving conveyor to be moving constantly. If articles were arrested where they emanated from the processing or producing machine, e.g. a folder of book or magazine signatures, so that a batch was stacked by successive deposition of the articles directly above one another and then released from that arrest so that it was carried away by a perpetually moving conveyor, that conveyor would have to be moving very fast in order that the trailing edge of the batch should be clear of the arresting position before the next batch had to be started. It is therefore preferred in order to allow for high speed running of the producing machine without such high speed, running of the conveyor that the articles should be delivered to a continuously moving conveyor without being arrested so that they adopt a shingled relationship on the conveyor. However, when as in most processes and especially book-making it is desired eventually to have the articles of the batches vertically stacked above one another.

SUMMARY OF THE INVENTION

Converting the shingled stack to a vertical stack implies a further handling step and this invention provides a mechanism and method for that, operable in a continuous and in-line fashion.

In one form of the present invention signatures or batches thereof may be delivered sequentially onto a continuously moving conveyor in a shingled formation and be assembled into stacks by a pusher adapted to travel in the same direction as the run of the reception conveyor carrying the shingled articles and to project into the array of shingled articles at the end of a batch of such articles, the pusher being adapted to travel faster than the reception conveyor to act against articles of the batch forward of it, and retarding means adapted to enter into the path of a batch of articles during the time only that the pusher acts to cause the rearmost member of the shingled batch of articles to arrive vertically stacked above the first of the batch of articles, the retarder member then being retracted. Further conveying of the then stacked articles is then continued either by the pusher or by a further conveying mechanism which may move at the same speed as the pusher or faster.

In this way it can be seen that articles successively deposited on a conveyor moving continuously at a first speed so that they are disposed in a shingle formation have been accelerated to a higher speed, that of the pusher, at the same time as they are being moved from a shingled relationship to a directly stacked relationship, the accuracy of the stacking being assured by a retarder which is placed in the path of the batch and which moves slower than the pusher but which is retracted as soon as the distance between the retarder and the pusher acting on the batch is essentially the same as the length of the articles in the batch.

The shingled articles will preferably be delivered to the reception belt in a batchwise manner but the batches need not be separated by a free space in the direction of the movement.

In the present embodiment an increased spacing in the shingling between the last member of one batch and the first of the succeeding batch is a feature of the design but the apparatus would work with constant shingling providing the minimum spacing was in the order of 25 mms. It is preferred also to capture or retain the trailing edge of the last member of a batch by a retention hook moving at the same speed as the reception conveyor which engages over the trailing edge of the last member of a batch and as that is deposited from the production machine.

In another aspect of the invention we provide a method of stacking articles which includes depositing articles destined to form a batch successively on a continuously moving reception conveyor means so that they adopt a shingled formation, acting on the last member of the batch by means of a pusher travelling faster than the reception conveyor means to cause successive members of the batch, beginning from the last, to accelerate, and bringing into the path of the batch from in front of the batch a retarder member travelling slower than the pusher and retracting the retarder member from in front of the batch when the distance of approach between the retarder member and the pusher is substantially the same as the length of the articles in the batch, whereby to form a stacked batch of the articles as the articles are successively accelerated by the pusher and as they abut against the face of the retarder which is nearer the batch. The method may further include, when the articles are delivered from a delivery fan or pocket, entrapping the trailing edge of the article last in each batch by hook means passing over that trailing edge as it is deposited from the pocket.

The mechanism and method are particularly applicable to the continuous book-making mechanism which have been described in co-pending application Ser. No. 489443, in the name of Bowman and others filed on the same day as the present application, where the outputs from the production machines would be the delivery pockets of the respective folder mechanisms.

DESCRIPTION OF THE DRAWINGS

A particular embodiment of the invention will now be described with reference to the accompanying diagrammatic drawings wherein.

DESCRIPTION OF PREFERRED EMBODIMENTS

Figure 1:
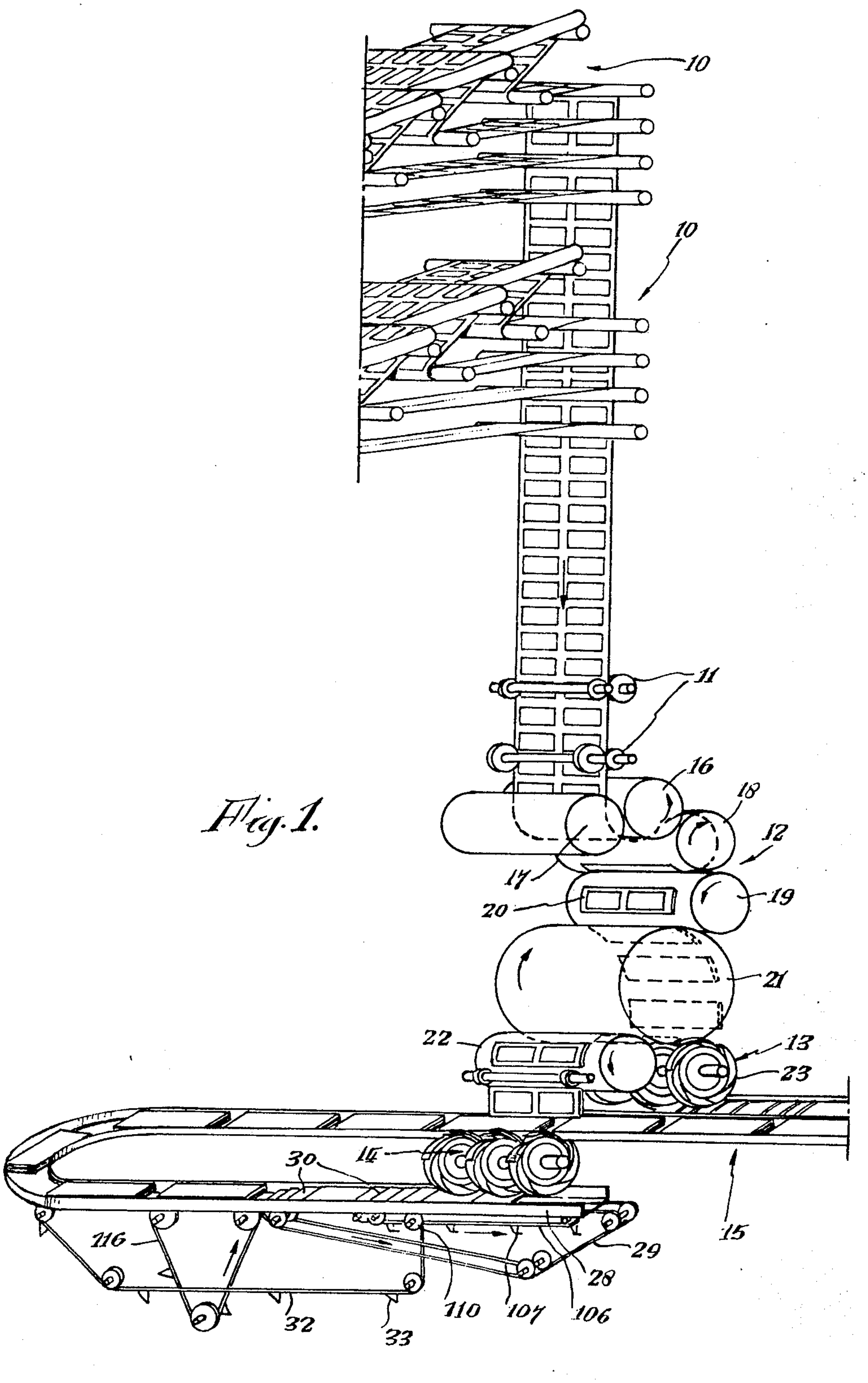
FIG. 1 is a perspective view of a delivery portion of a production machine.

In the present embodiment we show the stacking mechanism acting in an in-line book making system which produces books continuously from the output of two presses. The book making system, although novel, forms no part of the prevent invention. It is disclosed and claimed in the said co-pending Application No. 489443. It is disclosed here as one particularly preferable context for the use of the stacking mechanism, but the stacking mechanism is applicable to the stacking of shingled outputs from other production machines.

In the present embodiment there are two web inputs printed on each face and divided each into a plurality of ribbons, in this case four ribbons. These are then turned in turner bar assemblies 10 in such a way that four ribbons from each web are collated face to face with each other and the two sets of four ribbons are also collated face to face with each other. When the collated ribbons pass between draw rollers 11 therefore there are in the present example eight thicknesses of ribbon which pass to a folding and cutting mechanism generally indicated at 12. This has the function of delivering signatures, cut from the ribbons, sequentially to one collecting pocket 13 and then to another collecting pocket 14. The collecting pockets 13 and 14 deliver the signatures which they receive to a conveyor assembly 15 which takes them to a bindery.

After the collated ribbons have passed between draw rollers 11 they are cut to length by cutter cylinders 16, 17 and passed to folding cylinders 18 and 19 from which stage the completed folded signature such as 20 is transferred to a transfer cylinder 21 having leading edge clips which are operated to release signatures either to a first collecting pocket 13 or to a second transfer cylinder 22. From the second transfer cylinder signatures such as 20 can be released to the second pocket 14.

Each of the pockets 13 is made up of three discs mounted on a common rotating shaft and each disc having outwardly spiraling arms 23 in a manner known per se. Such pockets are also known in the art by various other names including "fliers" and "fans".

For high-speed operation individual signatures are delivered successively to within individual arms as the pockets rotate, these signatures then being stripped out successively onto the conveyor system which has a stacking mechanism embodying the invention which will now be described in more detail with more particular reference to FIGS. 2 to 4.

The reception conveyor 29 has a horizontal run which passes beneath the output of one of the collecting pockets 13 and 14 described previously. Only one stacking arrangement will be described; the other is identical. Folded book signatures are deposited in succession on the continuously moving conveyor 29 so that they adopt a shingled formation 30.

Because of the arrangements of the folding machine the signatures will be delivered in batches, with empty pockets between the batches, thus the shingled array 30 will consist of a plurality, say four, signatures at a comparatively narrow stagger (for example three centimeters between successive front edges) followed by a gap between the leading edge of the fourth member of that batch and the leading edge of the first member of the successing batch equal to five such spacings i.e. approximately 15 centimeters. An endless belt or chain 106 has on it hook elements 107 which may be brought around by travel of the chain 106 so that the hook is lowered over the trailing edge of the last member of each batch at the same time as that last member is being deposited from the collecting pocket (FIG. 4); the hook passes over the trailing edge of the blade 105 and lowers as the blade rotates away sideways. Other means may be used to entrap the trailing edge of the last member of a batch to prevent it shingling irregularly. An example of such means is a wheel lowered onto the said trailing edge to push it down onto the conveyor belt, which may permit higher speeds of operation. The chain 106 is adapted to travel at the same speed as the reception conveyor 29.

At 32 there is provided a belt or chain, in this example a chain, bearing pushers 33. If the conveyor 29 and the hook chain 106 are moving at a speed relative to the rate of delivery of the pocket 14 so that there is, say, 24 centimeters between leading edges of the first members of the successive batches then the chain 32 will be moved at such a speed that there would have been approximately 50 centimeters, i.e., it moves rather more than twice the linear speed. The pushers 33, which also have a separating function, are provided preferably only at one or both lateral edges of the signatures (and when at only one lateral edge, it is preferably the spine edge) and they are synchronised with the hook member 107 so that as successive pushers 33 travel in a run of the chain 32 between two sprockets 110, 111 they rise through the line of the conveyor 29 at a position behind the trailing edge of the last member of a given batch of signatures but well in front of the trailing edge of the leading member of the next batch so that they are under that next batch. These pushers are provided under one lateral edge only for preference because this has a tendency to bend the signatures 112 of the next batch, the one which is not being pushed by the pusher, about a longitudinal line (see FIG. 3) which holds them straight and strengthens them, and at the same time tending to throw them sideways against a stationary side wall 113 adjacent the belt 106 so that the members of the upper batch such as 112 have little tendency to be dragged forward by the pushers 33 which, it will be recalled, are travelling faster than the conveyor 29. However signatures in the batch preceding the pusher, i.e., signatures such as 114, FIG. 3 will be pushed forward by it at that higher speed so that they tend to catch up with the leading member of the batch. At the same time however as each pusher 33 is rising through the line of the run of the conveyor 29 to cause this action to start, a retarder member 115 on a retarder chain 116 is also rising, an erected retarder member 115' being seen in FIG. 2. Each retarder member offers a face rearward in the direction of its motion which is perpendicular to the line of the run of the conveyor 29 and to the line of the main horizontal run 117 of the chain 108. The retarding chain 116 is travelling at a speed slower than that of the pushers, for example 40 centimeters per batch compared with the 24 of the conveyor 29 and the 50 of the chain 32. This means that as the pusher 33 moves it is tending to move up to the retarder 115 which has been erected in front of it and as it accelerates the signatures of each batch to its own speed it compiles them one directly above the other against the vertical face offered by the rear of the retarder. Whether the articles of the batch other than the leading one travel bodily in shingled formation under the influence of the push exerted on the rearmost one so that they strike the rear face of the retarder 115 successively starting from the bottom, or whether they are brought forward successively and singly from the rearmost will depend only on the frictional interaction between the articles in the batch. It is arranged that as soon as the distance between a given pusher 33 and retarder 115 is substantially the same as the length of the articles in each batch, the retarder (then at position 115') is retracted from in front of the batch as the chain 116 brings it round guide pulley 118 so that the whole of the batch, now stacked directly vertically one above the other, can be carried on at the speed of the pusher 33 and can be taken on by a further conveyor 37, possibly to be accelerated by that further conveyor to higher speeds. This retraction of the retarder 115 is arranged with reference to the position of the guide sprockets 118 and 118' which define the horizontal run of the retarding chain 116, the relative speed of that chain and of the pusher chain 108 and of the pitch spacing between the retarders 115 and between the pushers 33.

Figures 2, 3, 4:
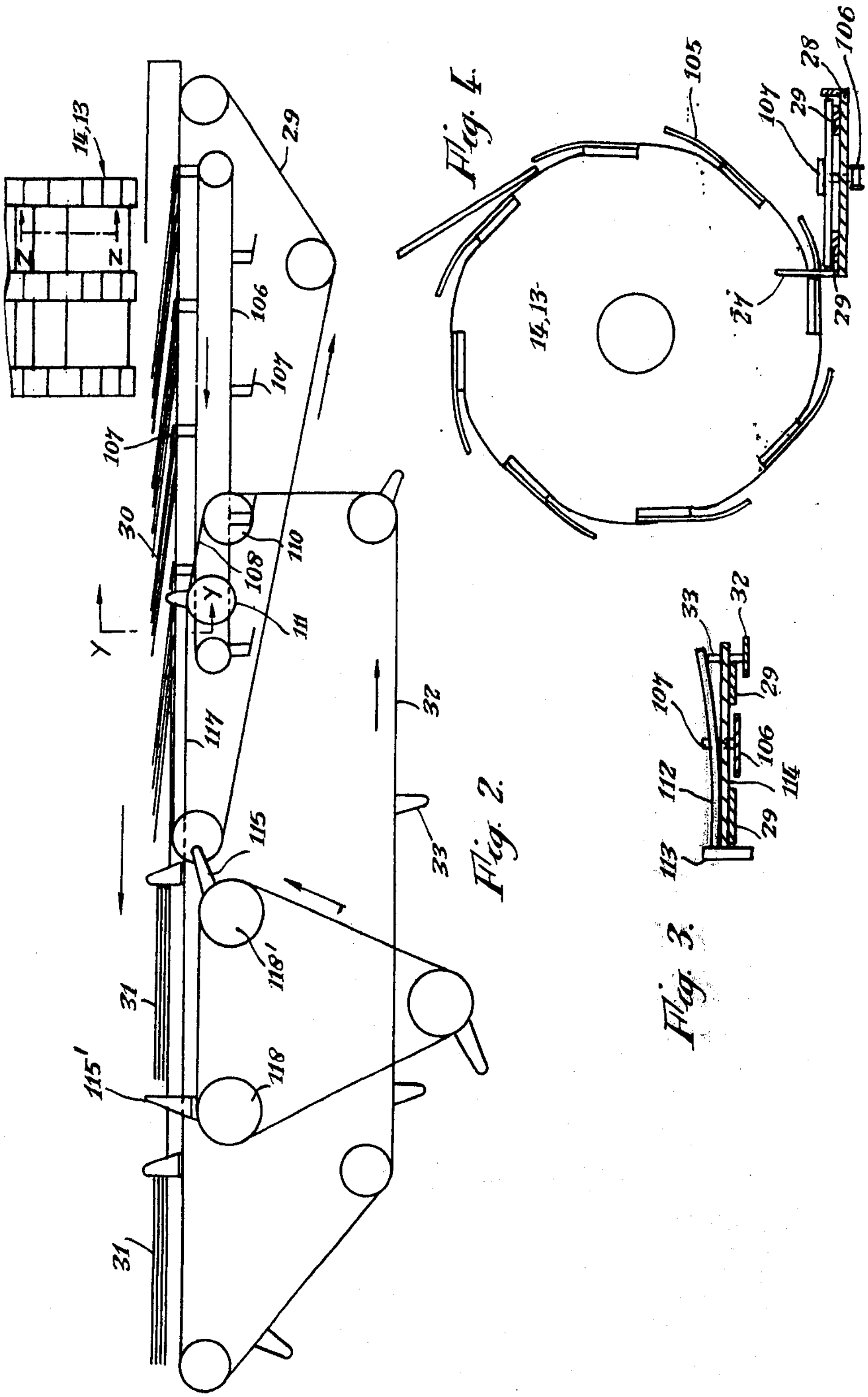
FIG. 2 is a side view of the stacking mechanism
FIG. 3 is a sectional view on the line Y—Y FIG. 2.
FIG. 4 is a sectional view on the line Z—Z.

If it is found that for a given run of articles the checking of the succeeding batch provided by the static wall 113, when the pusher 33 comes up beneath that succeeding batch, is insufficient then retarder means such as a retarder wheel to press lightly against the articles of the next succeeding batch may be provided in the region of the section line Y of FIG. 2.

In book-making systems there is particular advantage in providing the hook member 107 since these ensure that each batch of, say, four signatures is accurately and positively separated from the next one so that it can be quite certain that each stacked batch of four signatures contains the material of a given number of pages of a book in a given succession.

I claim:

1. A mechanism for converting a shingled batch of articles to a vertically stacked batch of articles comprising:

a. A conveyor means constrained to move continuously at a first predetermined speed;

b. A means for depositing articles successively on a conveyor section of said conveyor means to produce a shingled array of successive articles thereon, said successive articles having the same length;

c. A pusher means including a plurality of pushers adapted to move into the path of said shingled articles on said conveyor means and adapted to engage behind a plurality of shingled articles on said conveyor means and being constrained to move in a predetermined direction at a second predetermined speed greater than said first predetermined speed, said pushers being adapted to push said articles in front of said pushers;

d. A retarder means including a plurality of retarders adapted to move into the path and ahead of said shingled articles on said conveyor means and constrained to be moved continuously therealong in the same predetermined direction as said pusher means at a third predetermined speed greater than zero and less than said second predetermined speed, said retarders being removable from said path and having a generally vertical rear face when in said path, whereby a batch of articles pushed by the pushers is assembled behind said moving generally vertical rear face; and, e. Means for removing said retarders from said path when the distance between said retarders and said next approaching pushers is substantially equal to the length of each of said articles, said mechanism thereby leaving a batch of articles assembled in a stack to be taken forward on said conveyor means.

2. The mechanism of claim 1 wherein said conveyor means, pusher means and retarder means comprise endless flexible members and include guide wheels for determining the respective paths of said endless flexible members, and further wherein the pushers of said pusher means and retarders of said retarder means are moved into and removed from the path of said shingled articles on said conveyor means by passing over said guide wheels.

3. The mechanism of claim 2 wherein said guide wheels of said pusher means include a pair of wheels spaced apart in the direction of travel of said conveyor means, the plane containing the axis of said pair of wheels being inclined to said conveyor means whereby the second of the pair in the direction of travel of the pusher means is nearer the conveyor than the first, so that pushers borne on the flexible member of said pusher means rise through the line of said conveyor means as they travel from the first of the wheels of said pair to the second.

4. The mechanism of claim 3 wherein said pushers are provided adjacent to at least one lateral edge of said conveyor means, whereby articles succeeding said batch of articles and borne by said conveyor may be supported by said pushers to be flexed about a longitudinal line parallel to the direction of travel of said conveyor means.

5. The mechanism of claim 1 further comprising:

f. A hook means constrained to move at said first predetermined speed and adapted to engage over the trailing edge of the last article in said shingled array of articles.

6. The mechanism of claim 5 wherein said hook means are carried on an endless flexible means which is guided by guide wheels, said hook means being adapted to engage over the trailing edge of said batch of articles by passage over said guide wheels.

7. A method of assembling shingled articles into a vertically compiled stack while maintaining the forward travel of all of said articles, said method comprising:

depositing articles destined to form a stack successively on a continuously moving receiption conveyor means so that said articles adopt a shingled formation;

acting on the last member of said batch by means of a pusher traveling in a predetermined direction at a speed faster than said reception conveyor means to cause successive members of said batch, beginning from the last, to accelerate forward;

moving a retarder member continuously into the path of said batch in said predetermined direction of travel of said pusher and in front of said batch at a speed less than that of said pusher; and, retracting said retarder member from in front of said batch when the distance of approach between said retarder member and said pusher is substantially the same as the length of said articles in said batch, whereby a stacked batch of articles is formed as the articles are successively accelerated by said pusher and abut against the face of said retarder which is nearer said batch.

8. The method of claim 7 further including the initial step of:

depositing said articles on said reception conveyor from a rotating delivery pocket and entrapping some thereof by a hook means passing over the trailing edge of said articles thereby progressively entrapping the same as they are deposited from said pocket.

9. The method of claim 8 wherein said articles comprise signatures of books.

10. The method of claim 7 wherein the speed of said retarder members is less than the speed of said conveyor.

* * * * *